US011639801B2

(12) United States Patent
Peczalski et al.

(10) Patent No.: US 11,639,801 B2
(45) Date of Patent: May 2, 2023

(54) METHODS, SYSTEMS, AND DEVICES FOR HUMIDIFYING

(71) Applicant: Ademco Inc., Golden Valley, MN (US)

(72) Inventors: Andrzej Peczalski, Eden Prairie, MN (US); Tom Rezachek, Cottage Grove, MN (US); Alex Gu, Plymouth, MN (US); Brad Terlson, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 157 days.

(21) Appl. No.: 16/996,747

(22) Filed: Aug. 18, 2020

(65) Prior Publication Data

US 2020/0378639 A1 Dec. 3, 2020

Related U.S. Application Data

(60) Division of application No. 15/807,210, filed on Nov. 8, 2017, now Pat. No. 10,808,957, which is a (Continued)

(51) Int. Cl.
*F24F 11/00* (2018.01)
*F24F 6/00* (2006.01)

(Continued)

(52) U.S. Cl.
CPC ............ *F24F 11/0008* (2013.01); *F24F 6/00* (2013.01); *F24F 6/14* (2013.01); *F24F 11/46* (2018.01);

(Continued)

(58) Field of Classification Search
CPC .. F24F 6/00; F24F 6/14; F24F 11/0008; F24F 11/30; F24F 13/22; F24F 2110/10;

(Continued)

(56) References Cited

U.S. PATENT DOCUMENTS 1,994,331 A 3/1935 Ziskin et al.
2,101,603 A 12/1937 Stimson (Continued)

FOREIGN PATENT DOCUMENTS

CN 203852774 U 10/2014
JP 54023240 A 2/1979

(Continued)

OTHER PUBLICATIONS

"Installation Instructions for the Programmable Humidifier Automatic Flushing Timer," 2 pages, prior to Jan. 15, 2010.

(Continued)

*Primary Examiner* — Charles S Bushey
(74) *Attorney, Agent, or Firm* — Greenberg Traurig, LLP; Ryan D. Sharp; David J. Dykeman

(57) ABSTRACT

Methods, systems, and devices for humidifying are described herein. One method includes determining a temperature in a space associated with a humidifying unit, determining a relative humidity in the space, determining an air speed associated with the humidifying unit, and adjusting an amount of water sprayed by the humidifying unit based, at least in part, on the temperature, the relative humidity, and the air speed.

9 Claims, 3 Drawing Sheets

236
241
200
240
HUMIDIFIER
AIR FLOW
242
238

Related U.S. Application Data continuation of application No. 14/334,865, filed on Jul. 18, 2014, now Pat. No. 9,822,990.

(60) Provisional application No. 61/856,484, filed on Jul. 19, 2013.

(51) Int. Cl.

| | |
|---|---|
| ***F24F 13/22*** | (2006.01) |
| ***F24F 6/14*** | (2006.01) |
| ***F24F 11/77*** | (2018.01) |
| ***F24F 11/63*** | (2018.01) |
| ***F24F 11/46*** | (2018.01) |
| *F24F 11/30* | (2018.01) |
| *F24F 110/10* | (2018.01) |
| *F24F 110/20* | (2018.01) |
| *F24F 110/30* | (2018.01) |

(52) U.S. Cl.

CPC .............. *F24F 11/63* (2018.01); *F24F 11/77* (2018.01); *F24F 13/22* (2013.01); *F24F 11/30* (2018.01); *F24F 2013/221* (2013.01); *F24F 2110/10* (2018.01); *F24F 2110/20* (2018.01); *F24F 2110/30* (2018.01); *Y02B 30/54* (2013.01)

(58) Field of Classification Search

CPC ............... F24F 2110/20; F24F 2110/30; F24F 2013/221; Y02B 30/54

USPC ................. 261/129, 27, 44.1, 115, 117, 118, 261/DIG. 15

See application file for complete search history.

(56) References Cited

U.S. PATENT DOCUMENTS

| | | | | |
|---|---|---|---|---|
| 2,140,516 A | | 12/1938 | Cowan | |
| 2,519,515 A | | 8/1950 | Turner | |
| 2,533,794 A | | 12/1950 | Hanks et al. | |
| 2,587,834 A | | 3/1952 | Goode | |
| 2,777,935 A | | 1/1957 | Schmitt et al. | |
| 3,289,936 A | | 12/1966 | Coburn | |
| 3,319,046 A | | 5/1967 | Katzman et al. | |
| 3,365,181 A | | 1/1968 | Schwaneke | |
| 3,491,746 A | | 1/1970 | Swimmer et al. | |
| 3,523,175 A | | 8/1970 | Gygax | |
| 3,570,822 A | | 3/1971 | Peterson et al. | |
| 3,610,879 A | | 10/1971 | Katzman et al. | |
| 3,630,378 A | | 12/1971 | Bauman | |
| 3,659,078 A | | 4/1972 | Rudstrom | |
| 3,660,635 A | | 5/1972 | Liebert | |
| 3,672,706 A | | 6/1972 | Chilcoat | |
| 3,689,037 A | | 9/1972 | Payne | |
| 3,714,392 A | | 1/1973 | Katzman et al. | |
| 3,726,793 A | | 4/1973 | Bray | |
| 3,809,374 A | | 5/1974 | Schossow | |
| 3,846,295 A | | 11/1974 | Gibbs | |
| 3,855,371 A | | 12/1974 | Morrow et al. | |
| 3,867,485 A | | 2/1975 | Yeagle | |
| 3,892,945 A | | 7/1975 | Lerner | |
| 3,898,976 A | | 8/1975 | Coffman, Jr. | |
| 3,990,427 A | | 11/1976 | Clinebell | |
| 4,028,526 A | | 6/1977 | Schossow | |
| 4,031,918 A | | 6/1977 | Cagle | |
| 4,054,122 A | | 10/1977 | Reed | |
| 4,132,883 A | | 1/1979 | Grime | |
| 4,155,001 A | | 5/1979 | Schossow | |
| 4,158,679 A | | 6/1979 | Yeagle | |
| 4,169,261 A | | 9/1979 | Alpaugh | |
| D253,846 S | | 1/1980 | Morrow | |
| 4,211,735 A | | 7/1980 | Berlin | |
| D258,609 S | | 3/1981 | Vogt | |
| 4,257,389 A | | 3/1981 | Texidor et al. | |
| 4,257,989 A | | 3/1981 | Nishikawa | |
| 4,287,407 A | | 9/1981 | Treiber et al. | |
| 4,384,873 A | | 5/1983 | Herr | |
| 4,463,248 A | | 7/1984 | Katzman et al. | |
| 4,494,596 A | * | 1/1985 | Bradshaw | F24F 3/14 261/153 |
| D280,660 S | | 9/1985 | Muchenberger | |
| D281,271 S | | 11/1985 | Meyer et al. | |
| 4,559,789 A | | 12/1985 | Rick | |
| 4,564,746 A | | 1/1986 | Morton et al. | |
| D283,265 S | | 4/1986 | Preskey et al. | |
| 4,589,409 A | | 5/1986 | Chatbum et al. | |
| 4,626,346 A | | 12/1986 | Hall | |
| 4,650,586 A | | 3/1987 | Ellis, III | |
| 4,668,854 A | | 5/1987 | Swan | |
| 4,675,505 A | | 6/1987 | Fischer | |
| 4,705,936 A | | 11/1987 | Fowler | |
| 4,724,104 A | | 2/1988 | Kim | |
| 4,770,770 A | | 9/1988 | Regunathan et al. | |
| 4,841,122 A | | 6/1989 | Marton | |
| 4,869,853 A | | 9/1989 | Chen | |
| 4,952,779 A | | 8/1990 | Eaton-Williams | |
| 4,997,553 A | | 3/1991 | Clack | |
| 5,024,265 A | | 6/1991 | Buchholz et al. | |
| D320,072 S | | 9/1991 | Youngeberg | |
| D322,122 S | | 12/1991 | Guetersloth et al. | |
| 5,075,047 A | | 12/1991 | Youngeberg | |
| 5,079,950 A | | 1/1992 | McKiernan et al. | |
| 5,128,035 A | | 7/1992 | Clack et al. | |
| D338,952 S | | 8/1993 | Snow | |
| 5,252,260 A | | 10/1993 | Schuman | |
| 5,256,279 A | | 10/1993 | Voznick et al. | |
| D342,989 S | | 1/1994 | Wallen | |
| 5,294,197 A | | 3/1994 | Prill et al. | |
| 5,317,670 A | | 5/1994 | Elia | |
| 5,341,986 A | | 8/1994 | Galba et al. | |
| 5,363,471 A | | 11/1994 | Jones | |
| 5,406,673 A | | 4/1995 | Bradd et al. | |
| 5,407,604 A | | 4/1995 | Luffman | |
| 5,425,902 A | | 6/1995 | Miller et al. | |
| 5,440,668 A | | 8/1995 | Jones | |
| 5,445,143 A | | 8/1995 | Sims | |
| 5,497,628 A | * | 3/1996 | Stueble | F24F 1/0038 261/23.1 |
| D370,254 S | | 5/1996 | Dancs et al. | |
| 5,516,466 A | | 5/1996 | Schlesch et al. | |
| 5,543,090 A | | 8/1996 | Morton et al. | |
| 5,546,926 A | | 8/1996 | Lake | |
| 5,598,971 A | | 2/1997 | Winther et al. | |
| 5,615,693 A | * | 4/1997 | Saitoh | A24C 5/1857 131/84.1 |
| 5,620,503 A | | 4/1997 | Miller et al. | |
| 5,758,018 A | | 5/1998 | Fowler, Jr. | |
| 5,851,444 A | | 12/1998 | Hansell, Jr. et al. | |
| 5,880,438 A | | 3/1999 | Parrini et al. | |
| 5,884,492 A | * | 3/1999 | Zwicky | F24F 11/0008 261/36.1 |
| 5,906,800 A | | 3/1999 | Napierkowski et al. | |
| D409,737 S | | 5/1999 | Nilsson | |
| 5,942,163 A | | 8/1999 | Robinson et al. | |
| D416,994 S | | 11/1999 | Kensok et al. | |
| 5,976,363 A | | 11/1999 | Monroe et al. | |
| 6,019,820 A | | 2/2000 | Leverett | |
| 6,053,482 A | | 4/2000 | Glenn et al. | |
| 6,078,729 A | | 6/2000 | Kopel | |
| 6,092,794 A | | 7/2000 | Reens | |
| 6,103,125 A | | 8/2000 | Knepper | |
| 6,120,682 A | | 9/2000 | Cook | |
| 6,129,285 A | * | 10/2000 | Schafka | B05B 16/60 236/44 C |
| 6,148,144 A | | 11/2000 | Milanese | |
| 6,190,558 B1 | | 2/2001 | Robbins | |
| 6,195,013 B1 | | 4/2001 | Robinson | |
| 6,253,964 B1 | | 7/2001 | Rainey | |
| 6,260,514 B1 | | 7/2001 | Ehling et al. | |
| 6,286,181 B1 | | 9/2001 | Kasper et al. | |
| 6,339,952 B1 | | 1/2002 | Potter et al. | |
| 6,354,572 B1 | | 3/2002 | Menassa | |
| 6,375,849 B1 | | 4/2002 | Crabtree et al. | |

(56) References Cited

U.S. PATENT DOCUMENTS

D456,887 S 5/2002 Zlotnik
6,394,427 B1 5/2002 Guetersloh et al.
6,397,001 B1 5/2002 Montagnino et al.
D458,356 S 6/2002 Redner et al.
6,398,196 B1 6/2002 Light et al.
6,560,408 B2 5/2003 Glucksman et al.
6,588,734 B2 7/2003 Redner et al.
D486,896 S 2/2004 Long et al.
6,715,743 B2 4/2004 Zhang
6,727,822 B2 4/2004 Chamberlin et al.
D492,759 S 7/2004 Yoshida
6,773,588 B2 8/2004 Beeman et al.
6,810,732 B2 11/2004 Shon
6,845,755 B2 1/2005 Cook et al.
6,846,407 B2 1/2005 Anderson et al.
D516,192 S 2/2006 Kang
D516,689 S 3/2006 Salmon et al.
D519,622 S 4/2006 Cocchi
7,043,974 B2 5/2006 Grossman et al.
7,066,452 B2 6/2006 Rotering et al.
7,068,924 B2 6/2006 Watanabe et al.
D532,497 S 11/2006 Engel et al.
D540,819 S 4/2007 Schmitt et al.
D540,929 S 4/2007 Kowis et al.
D554,246 S 10/2007 Seelig et al.
7,281,498 B2 10/2007 Besik
D557,784 S 12/2007 Stead
7,389,688 B1 6/2008 Vander Horst
D573,703 S 7/2008 Gosselin et al.
7,434,741 B2 10/2008 Helt et al.
D593,190 S 5/2009 Glass
D596,728 S 7/2009 Campbell et al.
D598,526 S 8/2009 Pitchford et al.
D600,252 S 9/2009 Yan et al.
7,623,771 B2 11/2009 Lentz et al.
7,673,855 B2 3/2010 Anderson et al.
7,673,858 B2 3/2010 Anderson et al.
7,673,859 B2 3/2010 Novotny et al.
7,766,310 B2 8/2010 Wolff et al.
7,826,725 B2 11/2010 Wolff et al.
D630,310 S 1/2011 Beland et al.
D631,145 S 1/2011 Beland et al.
7,904,608 B2 3/2011 Price
8,079,575 B2 12/2011 Novotny et al.
8,128,069 B2 3/2012 Reens
8,231,112 B2 7/2012 Cao et al.
8,292,270 B2 10/2012 Terlson et al.
8,302,943 B2 11/2012 Wang et al.
8,376,322 B2 2/2013 Hoglund
8,490,951 B2 7/2013 Feldstein et al.
8,794,603 B2 8/2014 Quam et al.
8,833,739 B2 9/2014 Wang et al.
8,991,794 B1 3/2015 Boonstra
9,004,461 B2 4/2015 Schwendinger et al.
9,091,497 B2 7/2015 Schwendinger et al.
9,174,017 B2 11/2015 Potharaju et al.
9,360,261 B2 6/2016 Hashimoto
9,406,666 B2 8/2016 Naito
9,806,705 B2 10/2017 Landry et al.
9,822,990 B2 11/2017 Peczalski et al.
10,508,820 B2 12/2019 Quadroni et al.
10,808,957 B2 10/2020 Peczalski et al.
10,900,680 B2 * 1/2021 Peczalski ................ F24F 13/22
2002/0100716 A1 8/2002 Bosko
2003/0133842 A1 7/2003 Williams et al.
2003/0146757 A1 8/2003 Aguero et al.
2003/0230522 A1 12/2003 Pavel
2004/0084787 A1 5/2004 Williams et al.
2005/0150491 A1 7/2005 Chen
2005/0212152 A1 9/2005 Reens
2006/0027267 A1 2/2006 Fritze
2007/0187530 A1 8/2007 Byrd
2007/0254255 A1 11/2007 Neville et al.
2008/0079177 A1 4/2008 Schuld
2008/0131103 A1 6/2008 Nordmann
2008/0173032 A1 7/2008 Kammerzell et al.
2010/0001097 A1 1/2010 Spivak
2011/0203456 A1 8/2011 Hakansson
2012/0145255 A1 6/2012 Spano, Jr. et al.
2013/0139996 A1 6/2013 Hashimoto
2013/0327156 A1 12/2013 Peczalski et al.
2014/0007698 A1 1/2014 Peczalski et al.
2014/0035331 A1 * 2/2014 Sawyer .................. A47C 7/744
297/180.15
2014/0199484 A1 7/2014 Larson et al.
2015/0021796 A1 1/2015 Peczalski et al.
2017/0134214 A1 5/2017 Sethuraman et al.
2018/0066862 A1 3/2018 Peczalski et al.
2018/0094825 A1 4/2018 Peczalski et al.

FOREIGN PATENT DOCUMENTS

JP 62095189 A 5/1987
JP 63270592 A 11/1988
JP 1003442 A 1/1989
JP 5296505 A 11/1993
JP 7293953 A 11/1995
JP 11300341 A 11/1999
JP 2003314865 A 11/2003
JP 2004293936 A 10/2004
WO 2014066882 A1 5/2014

OTHER PUBLICATIONS

"Photograph of Remote Nozzle for Elite Steam Humidifier, Manufactured by GeneralAire," 1 page, Sep. 25, 2006.

"Pictures of Hayward Universal StopCock Valves," 3 pages, Oct. 29, 2007.

Ab Sibe International, "Pure Water for Air Humidification Systems," 2 pages, 1999. (Applicant points out, in accordance with MPEP 609.04(a), that the year of publication, 1999, is sufficiently earlier than the effective U.S. filing date, so that the particular month of publication is not in issue.).

Aprilaire, "Humidifiers, Owner's Manual for Models 110, 112, 220, 224, 350, 360, 440, 445, 448, 558, 560, 568, 760, and 768," 20 pages, Feb. 2005.

Aprilaire, "Humidifiers, Owner's Manual for Models 350, 360, 400, 400M, 500, 500M, 600, 600M, 700, and 700M," 11 pages, Jun. 2010.

Aprilaire, "Model 800 Residential Steam Humidifier, Installation and Maintenance Instructions," 16 pages, May 2010.

Armstrong, "HumidiClean Series HC-4000 Humidifier," 10 pages, Oct. 1999.

AutoFlo, "Electronics Steam Unit-Power Humidifier Models S2000 and S2020 Installation Instructions and Owner's Manual," 11 pages, prior to Aug. 7, 2003.

AutoFlo, "Electronics Steam Unit-Power Humidifier Models S2000 and S2020 Installation Instructions and Owner's Manual," 12 pages, 1999-2003. (Applicant points out, in accordance with MPEP 609.04(a), that the year of publication, 1999-2003, is sufficiently earlier than the effective U.S filing date, so that the particular month of publication is not in issue.).

Carel USA, "HomeSteam Elite Residential Whole House Humidifier," downloaded from http://www.carelusa.com/homesteam.htm, 3 pages, printed Jul. 25, 2003.

Carel, "HomeSteam Elite Residential Steam Humidifier, Installation, Operating, and Maintenance Manual," 24 pages, prior to Aug. 7, 2003.

Carel, "HumiSteam X-Plus, Steam Humidifiers, User Manual," 60 pages, Mar. 16, 2011.

Carrier, "Humidifiers, Homeowner's Manual," 8 pages, 1998. (Applicant points out, in accordance with MPEP 609.04(a), that the year of publication, 1998, is sufficiently earlier than the effective U.S. filing date, so that the particular month of publication is not in issue.).

Dristeem, "XT Series Electrode Steam Humidifier, Installation, Operation, and Maintenance Manual," 72 pages, 2009. (Applicant points out, in accordance with MPEP 609.04(a), that the year of

(56) References Cited

OTHER PUBLICATIONS publication, 2009, is sufficiently earlier than he effective U.S. filing date, so that the particular month of publication is not in issue.).
GeneralAire, "Elite Steam Residential Steam Humidifiers, User Manual," 28 pages, prior to Oct. 11, 2007.
GeneralAire, "Model Elite Steam Humidifiers, User Manual," Revision 4.0, 48 pages, Mar. 2, 2015.
Hayward Flow Control Systems, "Control Valves," 2 pages, prior to Oct. 31, 2007.
Honeywell, "HE225 ByPass Flow-Through Humidifier," 8 pages, Jun. 2010.
Honeywell, "HE360 Powered Flow-Through Humidifier, Owner's Guide," 8 pages, 1997. (Applicant points out, in accordance with MPEP 609.04(a), that the year of publication, 1997, is sufficiently earlier than the effective U.S. filing date, so that the particular month of publication is not in issue.).
Honeywell, "HE420A,B and HE460A,B Steam Power Humidifiers, Product Data," 12 pages, 1998. (Applicant points out, in accordance with MPEP 609.04(a), that the year of publication, 1998, is sufficiently earlier than the effective U.S. filing date, so that the particular month of publication is not in issue.).
Honeywell, "HM700A1000 Electrode Steam Humidifier, Installation Instructions," 28 pages, Nov. 2015.
Honeywell, "The Best Humidifier Available," 2 pages, prior to Aug. 7, 2003.
http://www.ewccontrols.com/steam_humidifier.htm, "Steam Humidifier, Models S2000 and S2020," 2 pages, May 3, 2006.
http://www.michiganair.com/newsletters/2011-1/section3.htm, "Tis the Season to Humidify," 4 pages, printed Oct. 12, 2012.
http://www.powerspecialties.com/humidiclean.htm, "HumidiClean Humidifier, The Ionic Bed. The Final Resting Place for Ordinary Humidifiers," 4 pages, printed Nov. 23, 2002.
http://www.powerspecialties.com/humidiclean_specifcat.htm, "Humidiclean Suggested Specifications," 4 pages, prior to Aug. 7, 2003.
http://www.skuttle.com/f601.html, "Skuttle Model 60 Humidifier Flushing Timer," 2 pages, printed May 3, 2006.
Humidity Source, "ElectroVap MC2, Electrode Steam Humidifier, Technical Manual," 49 pages, downloaded Nov. 23, 2016.
US Humidifiers PLC, "Condair Mk5 Resistive Steam Humidifier," 4 pages, prior to Oct. 12, 2012.
US, "Calomax Steam Humidifier Range," 2 pages, Jul. 2002.
US, "PureFlo Water Treatment for Humidifiers," 2 pages, prior to Feb. 24, 2017.
Marshall-George, "Electrode vs Resistive Steam Humidifiers," downloaded from http://www.condair.co.uk/knowledge-hub/electrode-vs-resistive-humidifiers, 5 pages, printed Nov. 23, 2016.
Nortec, "NH-EL Series Engineering Manual," 59 pages, May 2014.
Nortec, "NHRS Series Resistive Element Steam Humidifier, Engineering Manual," Manual No. H-104, 26 pages, Feb. 18, 2008.
Nortec, "Nortec's GS Series, Condensing High Efficiency," 8 pages, prior to Aug. 7, 2003.
Nortec, "RH Series," 2 pages, downloaded Nov. 23, 2016.
Omega Engineering, "New Conductivity Level Switches," 5 pages, prior to Oct. 18, 2007.
Pure Humidifier, "Standard Water EC Series Electric Humidifier, Installation Instructions, Operation and Maintenance Manual," 24 pages, Jul. 13, 2015.
Skuttle Indoor Air Quality Products, "Model 60-Series High-Capacity Steam Humidifiers (Models 60-1, F60-1, 60-2 and F60-2)," 2 pages, prior to Aug. 7, 2003.
Standex Electronics, "Fluid Level Proximity, and Motion Sensors," 16 pages, prior to Oct. 18, 2007.
Standex Electronics, "LS300 Series—Conductive Fluid Level Sensor," Preliminary Data Sheet 2003, 2 pages, printed Oct. 18, 2007.
Hue Design Studio, "Comfort Mist Models," CMF Revision 01, 9 pages, Sep. 14, 2016.
Hue Design Studio, "Comfortmist Cyclone, Aesthetic Model Color, Finish & Material Guide," Revision 01, 8 pages, Sep. 14, 2016.
Hue Design Studio, "Comfortmist Pill, Aesthetic Model Color, Finish & Material Guide," Revision 01, 9 pages, Sep. 14, 2016.
Prosecution History from U.S. Appl. No. 14/334,865, dated Jun. 30, 2016 through Jul. 18, 2017, 41 pp.
Prosecution History from U.S. Appl. No. 15/807,210, dated Oct. 23, 2019 through Jun. 19, 2020, 33 pp.

* cited by examiner

METHODS, SYSTEMS, AND DEVICES FOR HUMIDIFYING

CROSS-REFERENCE TO RELATED APPLICATION(S)

This present application is a divisional of U.S. application Ser. No. 15/807,210, filed on Nov. 8, 2017 (issued as U.S. Pat. No. 10,808,957 on Oct. 20, 2020); which is a continuation of U.S. patent application Ser. No. 14/334,865, filed on Jul. 18, 2014, (issued as U.S. Pat. No. 9,822,990 on Nov. 21, 2017); which claims the benefit of U.S. Application No. 61/856,484, filed Jul. 19, 2013. U.S. patent application Ser. No. 15/807,210, filed Nov. 8, 2017, U.S. patent application Ser. No. 14/334,865, filed on Jul. 18, 2014, and U.S. Application No. 61/856,484, filed Jul. 19, 2013, are hereby incorporated by reference herein in their entirety.

TECHNICAL FIELD

The present disclosure relates to methods, systems, and devices for humidifying.

BACKGROUND

Providing and/or modifying levels of humidity (hereinafter referred to as "humidifying") can be an important aspect of providing comfort in interior spaces (e.g., buildings, cars, etc.). Humidifying can be used in spaces designated for specialized commercial operations, such as internet server centers and/or clean rooms (e.g., for integrated circuit fabrication). Humidifying may be of particular importance in dry climates and/or regions.

Previous approaches to humidifying may not be scalable to various sizes of interior spaces and/or heating, ventilation, and air condition (HV AC) systems. Thus, some approaches may be insufficient for a given space (e.g., previous approaches using ultrasonic humidifiers) and some approaches may use a prohibitive amount of energy (e.g., evaporative type humidifiers) for a given space. Other approaches, such as flow-through humidifiers, may develop water-produced scale and/or organic growth.

Additionally, because previous approaches may lack modularity and/or scalability, they may be difficult to control, unreliable, and/or prohibitively expensive to install and/or maintain.

DETAILED DESCRIPTION

Figure 1:
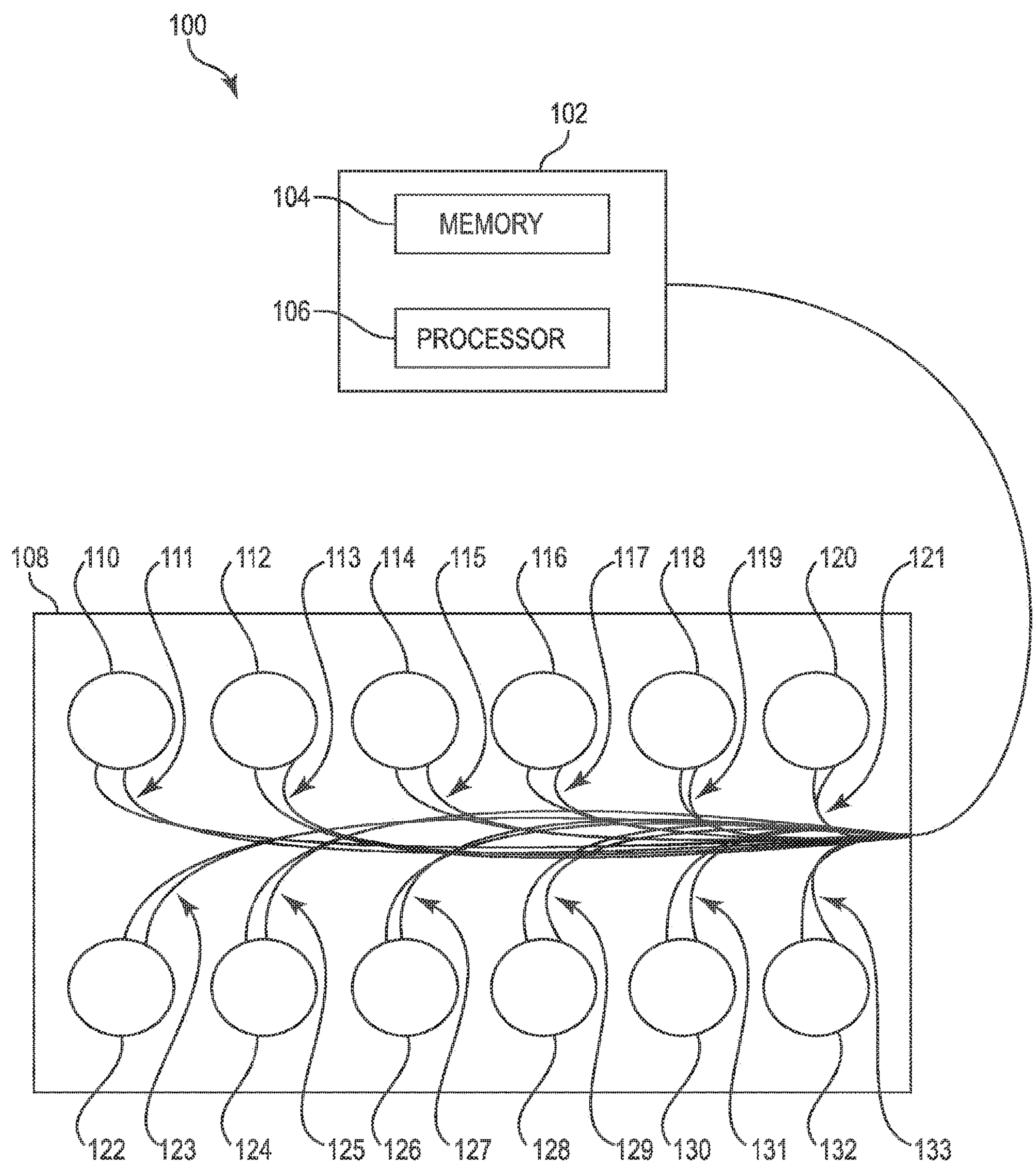
FIG. 1 illustrates a system for humidifying in accordance with one or more embodiments of the present disclosure.

Methods, systems, and devices for humidifying are described herein. One method includes determining a temperature in a space associated with a humidifying unit, determining a relative humidity in the space, determining an air speed associated with the humidifying unit, and adjusting an amount of water sprayed by the humidifying unit based, at least in part, on the temperature, the relative humidity, and the air speed.

In some embodiments, a humidifying device can be modular and scaled for use in small spaces (e.g., vehicles, residences) and/or large spaces (e.g., large residences, commercial buildings, etc.) as well as spaces between. Humidifying devices in accordance with one or more embodiments of the present disclosure can be used in spaces designated for specialized commercial operations, such as internet server centers and/or clean rooms (e.g., for integrated circuit fabrication). Because embodiments of the present disclosure can be modular, such embodiments may be easier to control, more efficient, and/or more reliable than previous approaches.

Various embodiments can include a plurality of spray units (e.g., spray heads) in an array, for instance (e.g., as part of a humidifying device or unit (hereinafter referred to as a "humidifier")). Each spray unit of the array can be controlled and/or operated (e.g., turned on and/or off) independently. Independent operation can be performed using a respective control component (e.g., actuator and/or electric switch) associated with each spray unit.

By operating the spray units independently of each other, embodiments of the present disclosure can allow each spray unit to be used for a reduced period of time and/or at intervals with respect to previous approaches. Independent operation can increase a lifetime of each individual spray unit, for instance, as well as a humidifier incorporating the array of spray heads.

The presence of a plurality of spraying units in the humidifier can allow for a gradual degradation of humidifier performance rather than abrupt degradation and/or failure as with previous approaches. For example, a humidifier having 12 spray heads where one has failed is only minimally reduced in performance versus a humidifier having a single spray head that fails. Thus, a useful life of the humidifier can be extended in instances where some of the spray heads experience failure(s).

Further, independent operation of spray units can allow for rotation of active spray units. That is, some embodiments can allow cycling of activated (e.g., turned-on and/or spraying) spray units. For example, a first subset of the array of spray units (e.g., a first nozzle plate) can be operated for a period of time (e.g., 1-2 minutes) and then a second subset of the array of spray units (e.g., a second nozzle plate) can be operated for another period of time (e.g., 1-2 minutes) while the first subset is deactivated. Thereafter, the first subset can be reactivated and/or a third subset (or more subsets) can be activated similarly.

Condensation problems associated with previous approaches can be reduced (e.g., eliminated) because by rotating activated spray units, embodiments of the present disclosure can avoid cooling portions of a humidifier (e.g., nozzle plate fixtures) to a degree such that water vapor condenses thereon. By reducing condensation, embodiments of the present disclosure can increase efficiency associated with operation of a humidifier and reduce (e.g., eliminate) contamination of air ducts with water, for instance. Durations of activity and/or inactivity of spray units can be determined based on one or more factors. For instance, rotation frequency may be increased based on increased level(s) of humidity. Rotation frequency may be decreased based on decreased fan speed(s) and/or temperature(s).

In an example, rotation can include a first subset of plurality of spray units being activated for a particular period of time. Then, the rotation can include a second subset of the plurality of spray units being activated and the first subset of the plurality of spray units being deactivated for the particular period of time. The subsets can be determined based on their location. For example, the firsts subset can be located on a first side of the humidifier and the second subset can be located on a second (e.g., opposing) side of the humidifier. Reducing condensation by rotating spray units can reduce humidifier deterioration caused by prolonged presence of moisture (e.g., on dry side of humidifier), for instance.

Modular designs in accordance with embodiments of the present disclosure are not limited to a particular configuration. Rather, such designs can be customized according to duct access, orientation (e.g., vertical or horizontal) and/or size. By way of example and not limitation, embodiments can include vertical configurations of one or more arrays of spray units and/or horizontal configurations of one or more arrays of spray units (e.g., using narrow trays and nozzle plate(s) inserted in a middle of a duct).

In addition to modularity, embodiments of the present disclosure can provide humidification in conjunction with cooling more efficiently than previous approaches. For example, in previous approaches, standard cooling heat exchange coils may extract humidity from air due to condensation on cold surfaces. Because the condensation releases heat, air conditioning units may need to compensate and thus consume more electricity.

Further, once previous approaches have removed humidity from the air an additional humidifying device (e.g., an evaporator) may be employed to replenish it. However, such devices may generate heat and thus utilize more electricity. Thus, in previous approaches, energy may be expended twice: first to condensate water from vapor, and then to evaporate water.

Embodiments of the present disclosure can reduce burdensome electricity usage by providing humidification and cooling in a single device. For example, some embodiments allow the regulation of water dispersed (e.g., sprayed) by a humidifier such that the water (e.g., all the water) evaporates rather than condenses on surfaces of ducts. Such embodiments may be based on a principle that the evaporation speed of a water droplet is proportional to the diameter of the droplet squared and inversely proportional to a difference between the dry and wet bulb temperature.

Further, the time of flight of a droplet before it reaches a surface on which it can be deposited may also be inversely proportional to the speed of the air carrying it. That speed, for instance, may be controlled and/or determined by the speed (e.g., setting) of a fan in forced air conditioning systems. Accordingly, embodiments of the present disclosure can finely control an amount of water used by a humidifier to achieve desired cooling and/or humidification while reducing condensation based, at least in part, on air temperature, humidity, and air speed.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of spray units" can refer to one or more spray units.

FIG. 1 illustrates a system 100 for humidifying in accordance with one or more embodiments of the present disclosure. As shown in FIG. 1, system 100 includes a control unit 102 communicatively coupled to a humidifying unit 108. Control unit 102 can, for example, be a computing device having a memory 104 (e.g., storing a set of executable instructions) and a processor 106 (e.g., configured to execute the executable instructions), though embodiments of the present disclosure are not so limited. For example, control unit 102 can include an integrated circuit and/or logic to perform a number of the functionalities described herein.

As shown in the embodiment illustrated in FIG. 1, control unit 102 can include a memory 104 and a processor 106. Memory 104 can be any type of storage medium that can be accessed by processor 106 to perform various examples of the present disclosure. For example, memory 104 can be a non-transitory computer readable medium having computer readable instructions (e.g., computer program instructions) stored thereon that are executable by processor 106 for humidifying in accordance with one or more embodiments of the present disclosure.

Memory 104 can be volatile or nonvolatile memory. Memory 104 can also be removable (e.g., portable) memory, or non-removable (e.g., internal) memory. For example, memory 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 104 is illustrated as being located in control unit 102, embodiments of the present disclosure are not so limited. For example, memory 104 can also be located internal to another computing resource (e.g., enabling computer readable instructions to be downloaded over the Internet or another wired or wireless connection).

Humidifying unit 108 can include a plurality (e.g., array) of spray units. As shown in FIG. 1, humidifying unit 108 can include a spray unit 110, a spray unit 112, a spray unit 114, a spray unit 116, a spray unit 118, a spray unit 120, a spray unit 122, a spray unit 124, a spray unit 126, a spray unit 128, a spray unit 130, and a spray unit 132 (sometimes generally herein referred to as "spray units 110-132"). Although 12 spray units are illustrated in the example shown in FIG. 1, embodiments of the present disclosure are not limited to a particular number of spray units.

As shown in FIG. 1, each of spray units 110-132 can be connected (e.g., communicatively coupled) to control unit 102 by a respective pair of wires: spray unit 110 is connected via wires 111, spray unit 112 is connected via wires 113, spray unit 114 is connected via wires 115, spray unit 116 is connected via wires 117, spray unit 118 is connected via wires 119, spray unit 120 is connected via wires 121, spray unit 122 is connected via wires 123, spray unit 124 is connected via wires 125, spray unit 126 is connected via wires 127, spray unit 128 is connected via wires 129, spray unit 130 is connected via wires 131, and a spray unit 132 is connected via wires 133 (the wires illustrated in FIG. 1 are sometimes cumulatively referred to herein as "wires 111-133").

Accordingly, control unit 102 can communicate with and/or control an operation of (e.g., activate and/or deactivate) each of spray units 110-132 independently (e.g., individually). Each of spray units 110-132 can include a spray nozzle. For example, each of spray units 110-132 can include an ultrasonic atomizer and/or nebulizer having a piezoelectric element (e.g., ceramic, crystal, etc.) attached to a metal plate with an array of small openings (e.g., holes), for instance (e.g., 10 microns in diameter). In an ultrasonic atomizer, voltage applied across the piezoelectric element (e.g., via any of the wires 111-133) can cause the element to vibrate and expel water droplets through the openings (e.g., a fine mist of water). Embodiments, however, are not limited to a particular type of spray unit and include various devices configured to disperse water (e.g., fine water droplets) into air.

Being modular, the embodiment illustrated in FIG. 1 can allow for the minimization of condensation upon any portion of humidifying unit 108. Because condensation may release heat, air conditioning units may use increased energy to maintain cool temperature levels in previous approaches. Embodiments of the present disclosure can regulate a length of activation time and/or an amount of water sprayed by one or more spray units of a humidifying unit such that the sprayed water is evaporated rather than condensed. Reducing condensation can include rotating one or more spray units, as discussed above, for instance.

Figure 2:
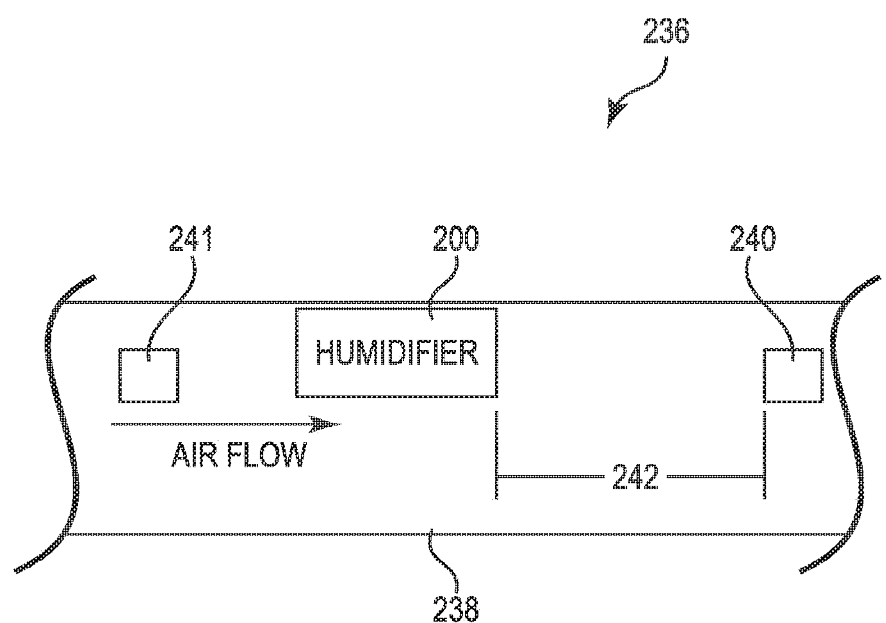
FIG. 2 illustrates another system for humidifying in accordance with one or more embodiments of the present disclosure.

FIG. 2 illustrates another system 236 for humidifying in accordance with one or more embodiments of the present disclosure. System 236 can, for example, combine a cooling system (e.g., an air conditioner) with a humidification system (e.g., a humidifier).

Embodiments of the present disclosure, including system 236 illustrated in FIG. 2, can make use of a principle that a rate of water droplet evaporation is proportional to a diameter of the water droplet squared and inversely proportional to a difference between a dry bulb temperature a wet bulb temperature. Another principle used by embodiments herein is that a time of flight (e.g., through a duct) of water droplets before they reach a surface on which they can be deposited is inversely proportional to a velocity of the air (e.g., the fan speed setting in a forced air conditioning system). Accordingly, in such a system, depending on a temperature of the air, a humidity, and a speed of the fan, a target (e.g., desired) cooling and/or humidification rate can be controlled by varying an amount of water released by the humidifier.

Additionally or alternatively, a target cooling and/or humidification rate can be controlled by varying an air speed passing (e.g., passing by, over, under, across, etc.) a humidifier. The air speed may be proportional and/or related to a speed (e.g., speed setting) of a fan of an HVAC system associated with the space.

As shown in FIG. 2, system 236 includes a humidifier 200 (e.g., a humidifier analogous to system 100 previously described in connection with FIG. 1) and a sensor unit 240 inside an air duct 238 (illustrated as a cross-section of a portion of a duct in FIG. 2). Sensor unit 240 is located a particular distance 242, in a direction of air flowing through the duct, from humidifier 200.

Though not shown, system 236 can include a fan. The fan may be in communication with a control unit (e.g., control unit 102, previously discussed in connection with FIG. 1) through a wired and/or wireless connection. In some embodiments, a fan may have a fixed speed. In other embodiments, a fan may have a number of discrete speed settings. In other embodiments, a fan speed may be continuously adjustable over a range of speeds. Embodiments of the present disclosure can include adjusting a speed of a fan (e.g., to provide desire cooling and/or air flow).

Sensor unit 240 can include a number of sensors. Although sensor unit 240 is illustrated as a single component, various adaptations and/or embodiments of sensor unit 240 are in accordance with embodiments of the present disclosure. For example, sensor unit 240 can include one or more temperature sensors. Temperature sensors can be configured to determine (detect, measure, and/or acquire) dry bulb temperature(s) inside duct 238.

Additionally, sensor unit 240 can include one or more relative humidity sensors. For example, the wet bulb temperature can be inferred from humidity and temperature measurements using a known relationship (e.g., dependence), which can be represented in a table and/or equation, for instance. Such examples are not to be taken in a limiting sense; rather, sensor unit 240 can include any number and/or type of sensor configured to determine various parameters associated with the air flowing through duct 238.

System 236 can include an upstream sensor unit 241. Upstream sensor unit 214 can include one or more temperature sensors and/or relative humidity sensors in a manner analogous to sensor unit 240, for instance. Upstream sensor unit 241 can be in communication with a control unit (e.g., control unit 102, previously discussed in connection with FIG. 1) through a wired and/or wireless connection, for instance. Upstream sensor unit 241 can be used in conjunction with sensor unit 240 to determine change(s) in temperature and/or humidity caused by humidifier 200. Locating upstream sensor 241 immediately upstream from humidifier 200 can allow embodiments of the present disclosure to moderate and/or finely tune one or more operations of humidifier 200.

As air flows through duct 238, humidifier 200 can disperse water droplets which can be carried through the air along distance 242. Distance 242 can be determined and/or selected such that the water droplets released from humidifier 200 have sufficient time to evaporate (e.g., sufficient time for humidity mixing in the air) before reaching sensor unit 240, for instance. Measurements associated with the flowing (e.g., flowing and humidified) air can be taken by sensor unit 240 and used by embodiments of the present disclosure to vary an amount of water released by humidifier 200, for instance, in controlling and/or maintaining a target cooling and/or humidification rate.

Various embodiments include maintaining relative humidity within a particular humidity range. That is, embodiments can maintain relative humidity below a first threshold and above a second threshold. As previously discussed, some embodiments include a control unit configured to receive an indication of the relative humidity and an indication of the temperature and cause a modification of an operation of the humidifying unit in response to at least one of the relative humidity and the temperature exceeding a particular threshold.

For example, a temperature difference between dry bulb temperature and wet bulb temperature can be kept below 5 degrees Celsius ($T_{drybulb}-T_{wetbulb}=5°$ C.). Additionally, the temperature at sensor unit 240 can be maintained above a particular threshold (e.g., greater than 15 degrees Celsius). Humidity can be controlled by keeping relative humidity on a curve corresponding to the difference between dry bulb temperature and wet bulb temperature. In the example where such a difference is 5 degrees Celsius, the curve can be represented by:

$$0.0216*T^2+1.8944*T+30.656.$$

Such a curve can be derived from various properties of humid air by maintaining the difference between the dry bulb temperature and wet bulb temperature at 5 degrees Celsius, for instance. It is to be understood that a different curve would correspond to a different temperature difference (e.g., a different curve would result from a difference between the dry bulb temperature and wet bulb temperature being 7 degrees Celsius) as well as other factors.

For increased temperature differences (e.g., 7 degrees Celsius), higher air speed and/or smaller duct size(s) may be used. Increased temperature differences may be used in embodiments having larger droplets (e.g., if droplet diameter increases by a factor of 1.41, temperature difference would increase two-fold).

Droplet size can be kept constant by maintaining parameters of spray units (e.g., nozzles). For example, droplet size can be kept constant by keeping spray unit frequency and/or actuation voltage under a threshold at which the droplets may tend to merge into a continuous stream of water.

To control humidity, various embodiments of the present disclosure can adjust a number of spray units that are activated and/or deactivated. The activation and/or deactivation can be responsive to a temperature exceeding a particular threshold. For example, a threshold temperature can be established (e.g., 16 degrees Celsius and/or 8 degrees Celsius below a set point of a thermostat associated with humidifier 200). Then, if a temperature determined by sensor unit 240 increases above the threshold temperature and a relative humidity determined by sensor unit 240 decreases below the curve (previously discussed) a spray unit (e.g., spray unit 122) can be activated.

If the thermostat is not requiring cooling, the threshold temperature may be higher (e.g., degrees Celsius and/or 2 degrees Celsius below the thermostat set point), so the cooling may not be as pronounced as previously discussed, but humidification can still be occurring. Thus, for various temperatures and velocities of incoming air, embodiments of the present disclosure can reduce (e.g., prevent) condensation by ensuring that water droplets are evaporated (rather than condensed).

Further, embodiments can deactivate humidifier 200 if relative humidity is determined by sensor unit 240 to exceed a particular threshold (e.g., 35%). In such instances, air conditioning (e.g., traditional air conditioning), rather than humidification, can be used to provide cooling. Accordingly, embodiments of the present disclosure can cause a modification of an operation of the humidifying unit in response to the relative humidity exceeding a particular threshold and/or the temperature exceeding a particular threshold.

Figure 3:
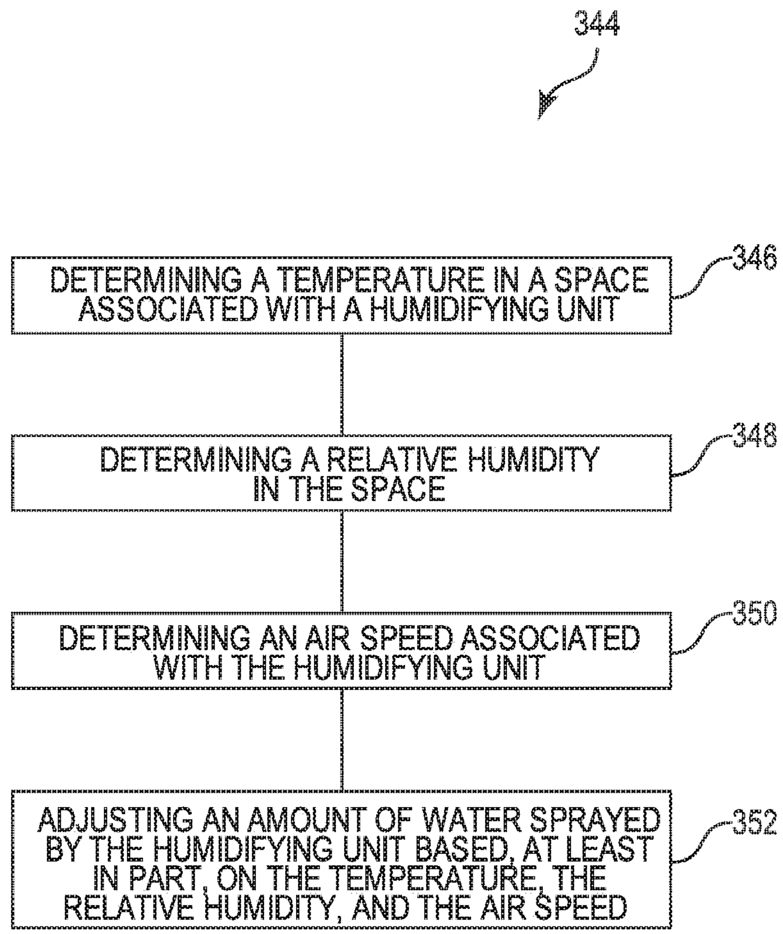
FIG. 3 illustrates a method for humidifying in accordance with one or more embodiments of the present disclosure.

FIG. 3 illustrates a method 344 for humidifying in accordance with one or more embodiments of the present disclosure. Method 344 can be performed by a control unit (e.g., control unit 102, previously described in connection with FIG. 1), for instance. The control unit can, for example, be a computing device, as previously discussed, though embodiments of the present disclosure are not so limited. For example, the control unit can include an integrated circuit and/or logic.

At block 346, method 344 includes determining a temperature in a space associated with a humidifying unit. In some embodiments, a temperature can be determined in a duct associated with a humidifying unit (e.g., as previously discussed). That is, method 344 can include determining a temperature in a duct at a particular distance downstream from the humidifying unit.

In other embodiments, a temperature can be determined at other locations. For example, a space associated with a humidifying unit may contain a thermostat. The thermostat can determine a temperature at its location in the space, for example. The thermostat can be in communication with the control unit through a wired and/or wireless connection, for instance. Embodiments of the present disclosure are not so limited however; a temperature can be determined at additional or other locations within the space.

At block 348, method 344 includes determining a relative humidity in the space. In some embodiments, a relative humidity can be determined in a duct associated with a humidifying unit (e.g., as previously discussed). That is, method 344 can include determining a downstream relative humidity in a duct at the particular distance downstream from the humidifying unit.

In other embodiments, a relative humidity can be determined at other locations. For example, a space associated with a humidifying unit may contain a thermostat. The thermostat can determine a relative humidity at its location in the space, for example. The thermostat can be in communication with the control unit through a wired and/or wireless connection, for instance. Embodiments of the present disclosure are not so limited however; a relative humidity can be determined at additional or other locations within the space.

At block 350, method 344 includes determining an air speed associated with the humidifying unit. An air speed can be a speed of air passing (e.g., passing by, over, under, across, etc.) the humidifying unit. The air speed may be proportional and/or related to a speed (e.g., speed setting) of a fan of an HVAC system associated with the space. In some embodiments, determining the air speed can include determining the fan speed. A relationship between fan speed and air speed can allow the determination of air speed based on fan speed. It is to be understood that such a relationship may vary depending on the particular installation and can be determined (e.g., calibrated), for instance, at the time of installation.

Accordingly the fan may be in communication with the control unit through a wired and/or wireless connection. In some embodiments, a fan may have a fixed speed. In other embodiments, a fan may have a number of discrete speed settings. In other embodiments, a fan speed may be continuously adjustable over a range of speeds. In some embodiments, a fan (e.g., a fan speed) associated with the humidifying unit can be adjusted (e.g., to provide desired cooling, humidity, and/or air flow).

At block 352, method 344 includes adjusting an amount of water sprayed by the humidifying unit based on the temperature, the relative humidity, and the air speed. Adjusting an amount of water sprayed by the humidifying unit can include activating and/or deactivating a portion of the humidifying unit (e.g., a number of spray units of the humidifying unit). Adjusting can include cycling of activated (e.g., turned-on and/or spraying) spray units. As previously discussed, in some embodiments, individual spray units can be controlled independently. The amount of water sprayed can be adjusted based on a desired humidity level in the space associated with the humidifying unit.

Though not shown in FIG. 3, method 344 can include determining an upstream relative humidity in a duct upstream from the humidifying unit. The upstream relative humidity can be determined using an upstream sensor unit (e.g., upstream sensor unit 214, previously described in connection with FIG. 2), which can include one or more temperature sensors and/or relative humidity sensors. Determining the upstream relative humidity can allow the determination of change(s) in temperature and/or humidity caused by the humidifier and/or the fine tuning of one or more operations of the humidifier. Additionally, many homes (especially in the southwestern United States, which have warmer climates) have ducted A/C systems. Embodiments of the present disclosure could be used as a humidifier that uses small "atomizer" plates that create droplets of water that are microscopic and uniform.

By tightly controlling the droplet size to something that is easily absorbed in a room temperature air stream, the system can output a significant level of moisture without risk of condensation in the ductwork. By spraying fine droplets in the air, the device can output far more moisture than an evaporative pad style device, and without the pressure drop associated with a honeycomb style pad. In this way, it can function as an evaporative cooler while recirculating the indoor air, regardless of the outdoor conditions.

This is different than present technologies in a number of ways. For example:

It does not rely on bringing in outdoor air, which may be undesirable for a number of reasons (e.g., high temperature, pollution, allergens).

It can be retrofitted to existing ductwork without new ductwork or adding an outdoor unit to the home.

It can function together with an air conditioner, instead of working against it.

Embodiments of the present disclosure could be utilized as an "atomizer" device that could be set up as a "stage" of cooling alongside a typical A/C system. A network of sensors in the home could detect the current temperature and relative humidity (RH %) to understand how much moisture could be absorbed in the airstream efficiently.

If the RH % is low enough and there is a need for cooling, the system could operate the humidifier instead of the air conditioner to attempt to meet the homeowner's set point. If the temperature load became too great, or the RH % rose above the desired level, the unit could be turned off and the traditional A/C could be used instead.

The energy savings for doing this could be substantial. Using a Seasonal Energy Efficiency Ratio (SEER) 15 system and $0.14 per kWh as a baseline, delivery of a gallon of water using this system would save $1.14. A gallon of water is $0.004/gallon (or $0.02 per gallon if we need to use reverse osmosis (RO) and only get 20% efficiency), so a 12 gallon/day system could save the homeowner over $13 per day in energy costs.

Embodiments of the present disclosure could be used as a traditional humidifier as well. In winter months when it is dry, the unit could add humidity to the air. This will increase the heating load and cause the furnace to run to reach temperature set points. One advantage of the embodiments of the present disclosure used in such a manner is that it can run both during "heat" cycles, but also just "fan" cycles on the main HV AC unit, since it does not rely on the furnace heat to evaporate moisture.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A humidifying unit, comprising:

a plurality of spray units; and a control unit connected to each of the plurality of spray units and configured to independently control a respective operation of each of the plurality of spray units, wherein the control unit is configured to control the respective operation of each of the plurality of spray units by maintaining a water droplet size sprayed by each of the plurality of spray units through keeping a spray unit frequency and a spray unit actuation voltage under a threshold.

2. The humidifying unit of claim 1, wherein the humidifying unit is configured to be installed at least one of horizontally in a duct or vertically in a duct.

3. The humidifying unit of claim 1, wherein the control unit is configured to control the respective operation of each of the plurality of spray units such that water sprayed from the humidifying unit evaporates before reaching a particular location in a duct.

4. The humidifying unit of claim 1, wherein the control unit is configured to:

activate a first subset of the plurality of spray units for a particular period of time; and deactivate the first subset of the plurality of spray units and activate a second subset of the plurality of spray units for the particular period of time.

5. The humidifying unit of claim 1, wherein the control unit is configured to receive a communication from one or more sensors configured to determine a temperature of a space associated with the humidifying unit, wherein the control unit is configured to control an amount of water sprayed by a spray unit in the plurality of spray units based on the temperature of the space, and wherein the control unit is configured to control the amount of water sprayed by the spray unit by maintaining the water droplet size sprayed by the spray unit.

6. The humidifying unit of claim 1, wherein the control unit is configured to receive a communication from one or more sensors configured to determine a humidity of a space associated with the humidifying unit, wherein the control unit is configured to control an amount of water sprayed by a spray unit in the plurality of spray units based on the humidity of the space, and wherein the control unit is configured to control the amount of water sprayed by the spray unit by maintaining the water droplet size sprayed by the spray unit.

7. The humidifying unit of claim 6, wherein the humidity of the space is a downstream humidity sensed in an air stream downstream of the humidifying unit, wherein the control unit is configured to receive a communication from a second sensor configured to determine an upstream humidity sensed in the air stream upstream of the humidifying unit, and wherein the control unit is configured to control the amount of water sprayed based on a difference between the downstream humidity and the upstream humidity.

8. The humidifying unit of claim 1, wherein the control unit is configured to receive a communication indicative of a fan speed from a HVAC system, wherein the control unit is configured to control an amount of water sprayed by a spray unit in the plurality of spray units based on the fan speed, and wherein the control unit is configured to control the amount of water sprayed by the spray unit by maintaining the water droplet size sprayed by the spray unit.

9. The humidifying unit of claim 1, wherein the control unit is configured to receive a communication from one or more sensors configured to determine a temperature of a space associated with the humidifying unit, wherein the control unit is configured to receive a communication from a sensor configured to determine a humidity of a space associated with the humidifying unit, wherein the control unit is configured to determine a wet bulb temperature based on at least the temperature of the space and the humidity of the space, and wherein the control unit is configured to control the amount of water sprayed by a spray unit in the plurality of spray units based on a difference between the temperature of the space and the wet bulb temperature.

* * * * *